(12) United States Patent
Batachia et al.

(10) Patent No.: US 7,047,227 B2
(45) Date of Patent: May 16, 2006

(54) INTERFACE BETWEEN VENDORS AND CUSTOMERS THAT USES INTELLIGENT AGENTS

(75) Inventors: Ion Leon Batachia, Bucharest (RO); Adrian Amariei, Medford, MA (US); Andrei George Niculescu, Bucharest (RO); Sorin Adrian Ursan, Braila (RO); Adrian Dinu, Brasov (RO); Alexandru Craciun, Dambovita (RO); Paula Emilia Marin, Bucharest (RO)

(73) Assignee: Voxage, Ltd. (KY)

( * ) Notice: Subject to any disclaimer, the term of this patent is extended or adjusted under 35 U.S.C. 154(b) by 633 days.

(21) Appl. No.: 09/865,111

(22) Filed: May 24, 2001

(65) Prior Publication Data

US 2002/0116349 A1    Aug. 22, 2002

Related U.S. Application Data

(60) Provisional application No. 60/257,595, filed on Dec. 22, 2000.

(51) Int. Cl.
*G06F 15/18* (2006.01)
*G06F 17/00* (2006.01)

(52) U.S. Cl. .......................................... 706/60; 706/11
(58) Field of Classification Search ............... 706/60
See application file for complete search history.

(56) References Cited

U.S. PATENT DOCUMENTS

| | | | |
|---|---|---|---|
| 5,155,763 A * | 10/1992 | Bigus et al. ................ 379/111 |
| 5,483,468 A | 1/1996 | Chen et al. ............. 364/551.01 |
| 5,504,837 A | 4/1996 | Griffeth et al. |
| 5,506,955 A | 4/1996 | Chen et al. ............. 395/183.02 |
| 5,553,235 A | 9/1996 | Chen et al. ............. 395/182.18 |
| 5,684,945 A | 11/1997 | Chen et al. ............. 395/182.18 |
| 5,794,207 A | 8/1998 | Walker et al. ................. 705/23 |
| 5,797,127 A | 8/1998 | Walker et al. .................. 705/5 |
| 5,872,834 A * | 2/1999 | Teitelbaum ............... 379/93.03 |
| 5,884,274 A | 3/1999 | Walker et al. .................. 705/4 |
| 6,012,045 A | 1/2000 | Barzilai et al. ............... 705/37 |
| 6,055,519 A | 4/2000 | Kennedy et al. |
| 6,085,178 A * | 7/2000 | Bigus et al. ................... 705/80 |
| 6,092,197 A | 7/2000 | Coueignoux ................ 713/200 |
| 6,138,105 A | 10/2000 | Walker et al. ................ 705/10 |
| 6,141,653 A | 10/2000 | Conklin et al. |
| 6,192,354 B1 * | 2/2001 | Bigus et al. ................... 706/46 |
| 6,285,985 B1 | 9/2001 | Horstmann .................. 705/14 |
| 6,397,193 B1 | 5/2002 | Walker et al. ................ 705/16 |
| 6,401,080 B1 * | 6/2002 | Bigus et al. .................. 705/37 |

(Continued)

FOREIGN PATENT DOCUMENTS

DE    100 20 782 A1    5/2001

(Continued)

OTHER PUBLICATIONS

"Launching The New Era"; Kazuhiro Fuchi, ICOT Research Center, Communication of the ACM, vol. 36, Issue 3 (Mar. 1993) ACM, pp.: 49-100.

(Continued)

*Primary Examiner*—Anthony Knight
*Assistant Examiner*—Michael B. Holmes
(74) *Attorney, Agent, or Firm*—Mintz Levin Cohn Ferris Glovsky and Popeo P.C.

(57) ABSTRACT

A method and apparatus for providing an interface to enhance a negotiation between an user agent and a partner agent includes viewing the negotiation on-line and to modify parameters of an agent in negotiation.

12 Claims, 17 Drawing Sheets

U.S. PATENT DOCUMENTS

| | | | |
|---|---|---|---|
| 6,553,346 B1 | 4/2003 | Walker et al. ................. | 705/1 |
| 6,714,797 B1 | 3/2004 | Rautila .................... | 455/552.1 |

FOREIGN PATENT DOCUMENTS

| | | |
|---|---|---|
| EP | 0 370 146 A | 5/1990 |
| EP | 1 041 500 A | 10/2000 |
| GB | 1 041 500 A2 | 4/2000 |

OTHER PUBLICATIONS

"Can Online Auctions Beat Online Catalogs"; Yaniv Vakrat, Abraham Seidmann, International Conference on Information Systems, proceeding of the 20th international conference on Information Systems, (1999), ACM, pp. 132-143.

"Intelligent Agents for an Artificial Market System"; Nikos Karacapilidis Industrial Management Lab, Pavlos Moraitis, Decision Support Systems Lab; International Conference on Autonomous Agents, proceeding of the fifth international conference of Autonomous agents, (2001) ACM, pp. 592-599.

PCT International Search Report dated Mar. 6, 2003.

Vakrat, et al., "Can Online Auctions Beat Online Catalogs?", *International Conference on Information Systems, Proceedings of the International Conference on Information Systems*, 1999, pp. 132-143.

European International Search Report dated Jun. 14, 2005.

\* cited by examiner

FIG. 12

Configure Agent for Premium Plans

Agent Name: Premium Plans Agent
Location: JFK Airport
Deadline: May 25th (Now)
2000
12 : 20 PM

| Parameters | Best ** | Worst. ** | MU | Importance* | Behavior |
|---|---|---|---|---|---|
| Call Duration | 36 | 5 | minutes | 0.4 | Concessive Behavior |
| Additional Price | 0.5 | 0.2 | USD | 0.3 | Concessive Behavior |
| Access Fee | 2 | 1 | USD | 0.2 | Aggressive Behavior |

(UPDATE) (RESET) (AGENT LIST)

FIG. 13

Behavior Editing Issues

1302 — Name: Aggressive Behavior

Tactics Editing

To add a new tactic select the heading checkbox.

| | Name | | Weight | Parameter |
|---|---|---|---|---|
| 1304 — ☑ | Time Exponential | ▼ | 0.1 ▼ | 0.1 |
| 1306 — ☐ | Select Tactic | ▼ | 0.1 ▼ | |
| 1308 — ☐ | Select Tactic | ▼ | 0.1 ▼ | |

| No | Agent Name | Partner | Status |
|---|---|---|---|
| 1.1 | Premium Plans Agent | new connection | 〽 ⊗ Active |

| No | Agent Name | Partner | Status |
|---|---|---|---|
| 1.13 | Premium Plans Agent | Aquila | Deal Failed |
| 1.14 | Premium Plans Agent | Antares | Deal Closed |
| 1.15 | Premium Plans Agent | Deleted Agent | Deal Closed |

| No | Parameter | Value | MU |
|---|---|---|---|
| 1 | Call Duration | 59 | minutes |
| 2 | Additional Price | 10 | USD |
| 3 | Access Fee | 10 | USD |

FIG. 18

| No | Parameter | My Agent Last Value | Partner Agent Last Value | MU |
|---|---|---|---|---|
| 1 | Call Duration | 29 | 30 | minutes |
| 2 | Additional Price | 5 | 2 | USD |
| 3 | Access Fee | 10 | 10 | USD |

FIG. 19

- N No : Negotiated Deals - the number of all the agent's negotiations
- CD No : Closed Deals - the number of successful deals
- NCD No : Failed Deals - the number of failed negotiations
- R No : Number of current live negotiations - the current negotiations
- SR : Succes Rate - the rapport between successful and number of all negotiations.
- FR : Fail Rate - the rapport between failures and total number of negotiations.

FIG. 20

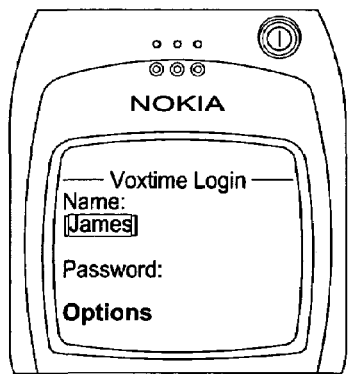

FIG. 21

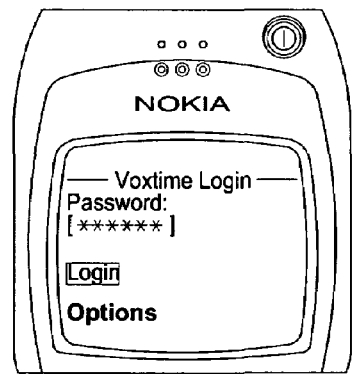

FIG. 22

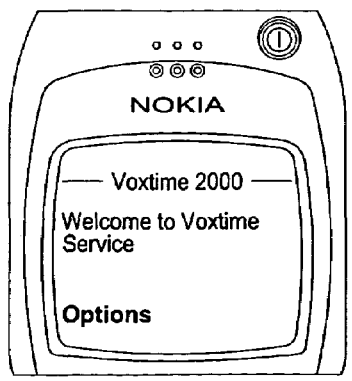

FIG. 23

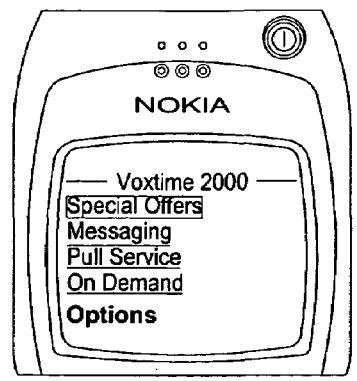

INTERFACE BETWEEN VENDORS AND CUSTOMERS THAT USES INTELLIGENT AGENTS

RELATED APPLICATIONS

This application claims priority to a previously filed provisonal application having ser. No. 60/257,595 and titled "Push/Pull Platform", which was filed on Dec. 22, 2000, the contents which are incorporated herein by reference.

FIELD OF THE INVENTION

The invention relates to an interface to sell products or services and in particular, to an user interface that enhances a negotiation between an user intelligent agent and a partner intelligent agent.

BACKGROUND OF THE INVENTION

The efficient utilization of information and communication has been the key to success of many business ventures. To obtain a competitive edge many companies have resorted to technology to disseminate, process and communicate information. For example, computers and fax machines have made possible almost instantaneous correspondence between two companies in which a business agreement could be expeditiously reached. The advent of the Internet has brought about new business opportunities that are categorically referred to as electronic commerce (e-commerce). E-commerce comes in a variety of forms such as business-to-business commerce (B2B commerce), business-to-customer commerce (B2C commerce) and customer-to-customer commerce (C2C commerce). E-commerce uses various business models such as providing a service in return for an advertising space on the customer's display or an online catalog that also allows for online entry of orders.

A previous problem concerning the Internet has been that instant access and mobility were substantially limited because, typically access to the Internet was performed using a computer that was tethered to a telephone line. For this and other reasons, many devices have been developed such as a laptop computer with a wireless modem, wireless Personal Digital Assistant (PDA), handheld Personal Computer (PC) with wireless capability and mobile phone with Internet access capability. Some of these devices may access the Internet using Wireless Application Protocol (WAP). Still there are other mobile phones that uses Simple Messaging Service (SMS) to take advantage of e-commerce.

E-commerce has also brought about applications that uses intelligent agents. Intelligent agents may be considered to be software-implemented personal assistants with authority delegated from their users. Each agent is a computer program that, in appropriate circumstances, stimulates a human relationship by performing something for a person that another person may otherwise do. One application that intelligent agents may perform are buying and selling goods and services on behalf of users. An intelligent agent may be configured to seek out other parties such as human users, computer systems, or other agents to conduct negotiations on behalf of their owners, even entering into commercial transactions.

Negotiation is a form of decision-making where two or more parties jointly search a space of possible solutions with goal of reaching a consensus. A negotiation may be viewed as competitive or cooperative. A competitive negotiation may be viewed as a decision-making process that resolves a conflict involving two or mote parties over a mutually exclusive goal. A cooperative negotiation, on the other hand, may be viewed as a decision-making process that resolves a conflict involving two or more parties over multiple interdependent, but non-mutually exclusive goals.

When establishing a partner for negotiation an intelligent agent should be able to determine what initial offers should be sent out, what is the range of acceptable agreements, what counter offers should be generated, when an agreement is reached and when negotiation should be abandoned. All these may be part of a reasoning model of an intelligent agent. However, there is room for improvements when designing intelligent agents with negotiation capabilities, to enable them to operate reliably, efficiently and profitably on behalf of their clients. This is especially important in competitive negotiations.

SUMMARY OF THE INVENTION

A method and apparatus for providing an interface to enhance a negotiation between an user agent and a partner agent includes viewing the negotiation on-line and to modify parameters of an agent in negotiation.

BRIEF DESCRIPTION OF THE DRAWINGS

For better understanding of the present invention, reference is made to the drawings which are incorporated herein by reference and in which:

FIG. 12 illustrates an Agent Configuration settings page in accordance with an embodiment of the invention;

FIG. 13 illustrates an Agent Behavior Settings page in accordance with an embodiment of the invention;

FIG. 14 illustrates a page with agent listing (listings) that are negotiating in accordance with an embodiment of the invention;

FIG. 16 is a History page that lists Agents' negotiation results in accordance with an embodiment of the invention;

FIG. 17 illustrates a page that shows a status of 'Deal Closed' in accordance with an embodiment of the invention;

FIG. 18 illustrates a page that shows a status of 'Deal Failed' in accordance with an embodiment of the invention;

FIG. 19 illustrates a Negotiation Statistics page in accordance with an embodiment of the invention; and FIGS. 20–36 illustrate a WAP interface together with images that depict screens that appear on a wireless phone in accordance with an embodiment of the invention.

DETAILED DESCRIPTION

Figure 1A:
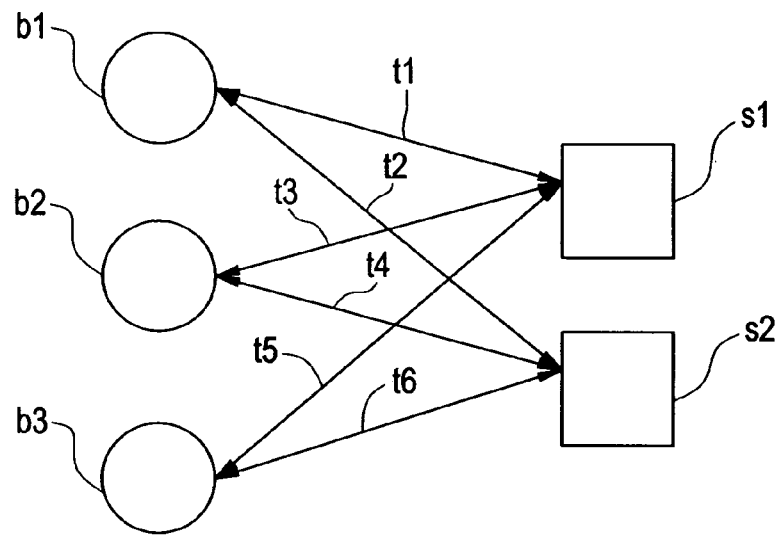
FIG. 1 illustrates one possible network environment in which an embodiment of the invention may be implemented.
Figure 1B:
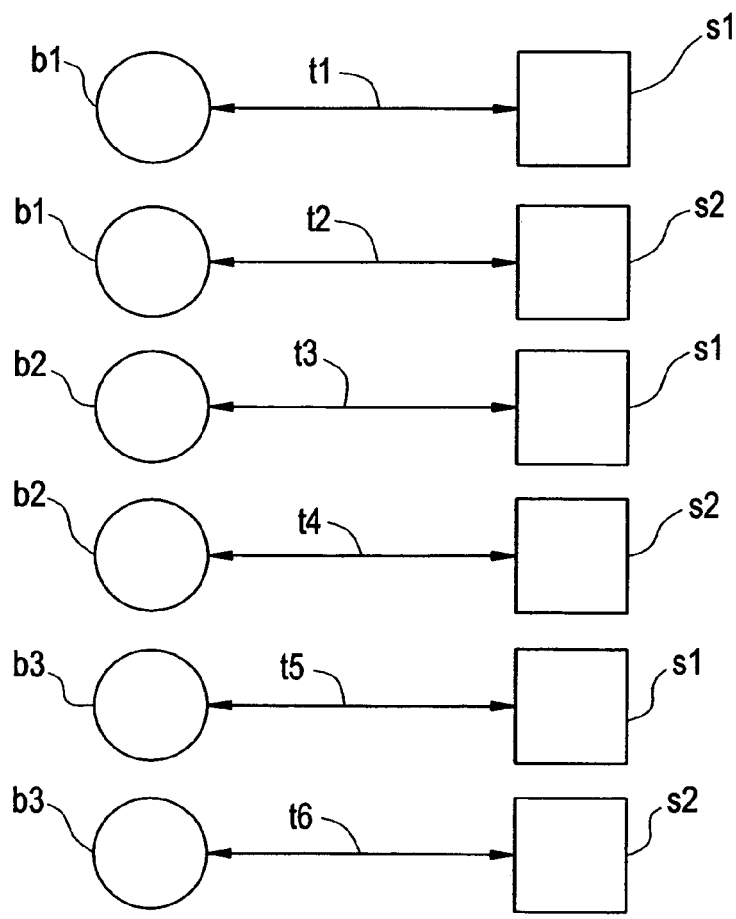

FIG. 1 illustrates one possible network environment 100 in which an embodiment of the invention may be implemented. The network environment 100 comprises the Internet 102, a wireless network 104 and a plurality of servers 106, 108, 109. Computers 116 such as Personal Computers (PCs), laptop computers and the like may be coupled to one or more servers 106 and wireless devices 114 such as mobile phones with Wireless Application Protocol (WAP) capability, wireless Personal Digital Assistants (PDAs), laptop computers with wireless capability and the like are wirelessly coupled to the wireless network 104. The Internet 102 is commonly represented as a cloud comprising of routers, bridges, switches, repeaters and the like that are interconnected together to transmit data in packet form from a source node to a destination node. A node is usually a gateway server 106 that acts as gateways to allow, for instance, PCs 116 to connect to the Internet 102 (the entity that provides this service is known as an Internet Service Provider (ISP)) or it is a resource server 108 that provides resources such as information, services and transactions. It should be noted that a gateway and a resource may both be contained in one server. A user on a PC 116 connected to the Internet 102 may use a Web browser such as Microsoft's Internet Explorer or Netscape's Navigator to access various resources provided by the servers.

The preferred mode of transmission in the Internet 102 is Transport Control Protocol/ Internet Protocol (TCP/IP) or User Datagram Protocol/Internet Protocol (UDP/IP). Wireless devices 114 are connected to the Internet 102 via a wireless network 104 that has access to the Internet 102 through a WAP gateway server 109. For users of the Internet 102, a graphic user interface (GUI) is installed in the user's computer 116 or wireless device 114 that interacts with the various servers 106, 108, 109.

Figure 2:
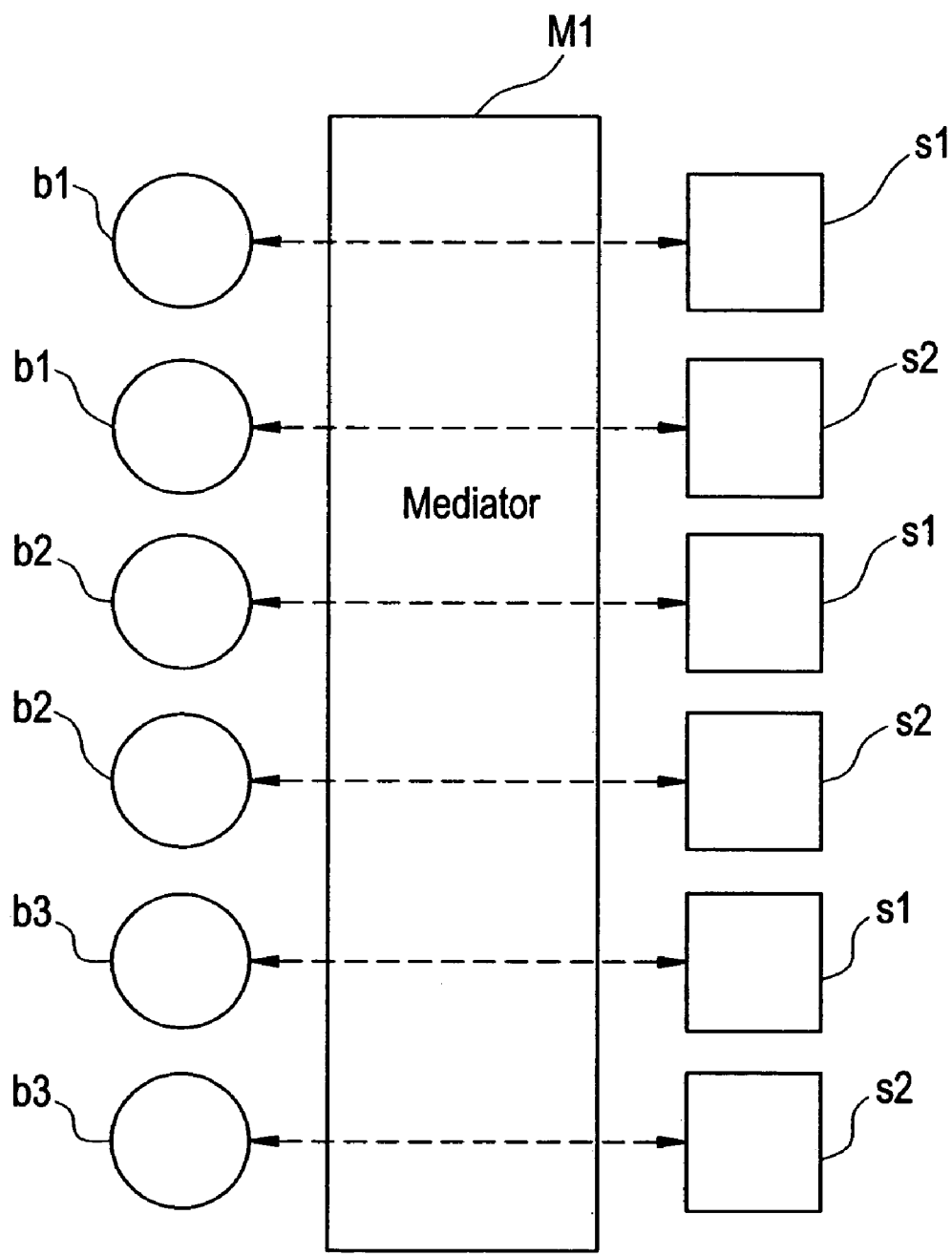
FIG. 2 illustrates a commercially available computer.

FIG. 2 illustrates a commercially available general-purpose computer 200 such as International Business Machine (IBM) compatible Personal Computer (PC) or a computer manufactured by Apple Computer Inc. and the like, that the user may use to connect to the gateway server 106. As is well known in the art, the computer 200 comprises a central processing unit 202 (CPU), a read only memory (ROM) 203 usually containing a Basic Input Output System (BIOS) 205, a main memory 206 usually represented by random access memories (RAMs) and various controllers 212, 214, 216, 222, 224, all connected together through a system bus 208. Attached to the computer are various peripheral devices such as a keyboard 232, a mouse 228, disk drives such as a Fixed Disk drive 238, a Floppy drive 234 and a Compac Disc (CD) ROM Drive 242, a video monitor 226, a printer 234, a modem 246 and the like via pertinent controllers that allow the computer 200 to communicate with the user or the outside world. Usually contained in the Fixed Disk drive 238 is an operating system, a portion which when the computer is activated, resides in the main memory 206; a Web browser, GUIs, application programs such as word-processor, spreadsheets and the like, which when called by the user via a mouse 228 or keyboard 232 is retrieved from the Fixed Disk drive 238 and resides in the main memory 206.

Figure 3:
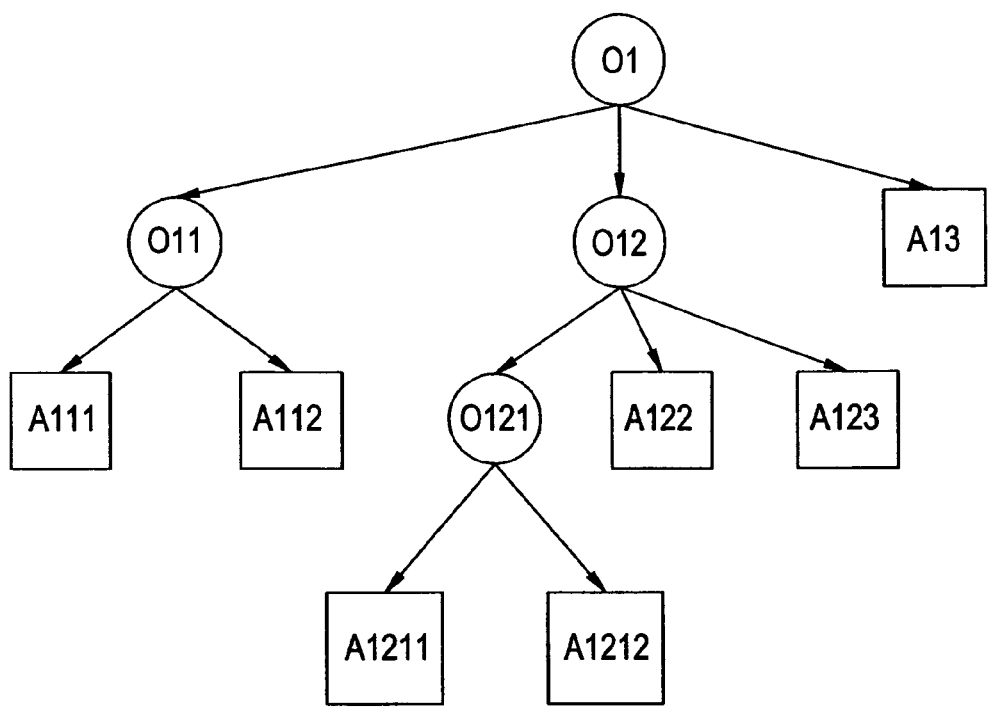
FIG. 3 illustrates a wireless phone with Wireless Application Protocol (WAP) capability.

FIG. 3 illustrates a mobile phone 300 with implemented WAP that provides connection to the Internet 102 via the WAP gateway server 109. The mobile phone 300 usually has a limited display 302 and input capabilities (in a form of limited alphanumeric keypad 304) that does not allow for sophisticated commands and displays. It should be noted that in the case of Global Satellite Mobile (GSM) phones, exchange of information and selections is via short messaging service (SMS), which is also limited.

Figure 4:
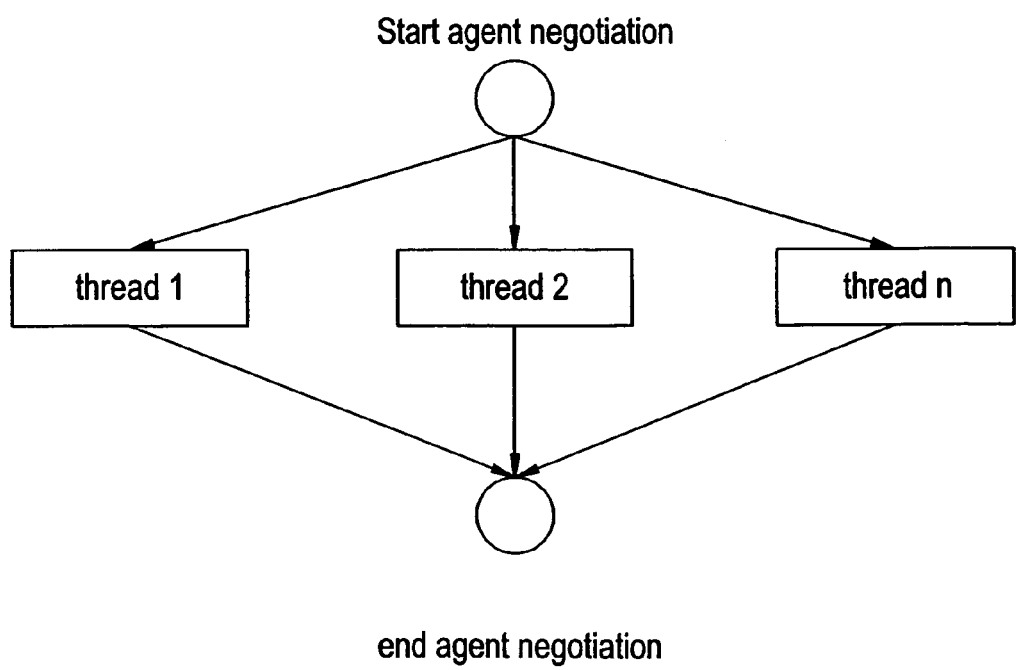
FIG. 4 illustrates one possible platform in which an embodiment of the invention may be implemented.

FIG. 4 shows one possible platform 400 in which an embodiment of the invention may be implemented. The platform 400 comprises a user interface 402, an extensible style language (XSL) processor 404, an offer package engine 406, a negotiation engine 407, a business rules and inference engine 408, a messaging engine 409 and a database 410. The platform 400 may be implemented in a server 106, 108, 109 that is connected to the Internet 102 as shown in FIG. 1. Computers 116 connected to the Internet 102 communicate and exchange information with the platform 400 via the Internet 102. Wireless devices 114 may also be connected to the platform 400 via the wireless network 104 and the WAP gateway server 109 that is in communication with the platform 400 via the Internet 102. The platform 400 may be constructed using an object-oriented approach and may follow various principles such as flexibility, scalability, modularity, portability and distribution of processing. Interaction with subscribers is handled by the user interface 402 that uses an Application Program Interface of the Web server (Netscape Server Application Program Interface—NSAPI or Internet Server Application Program Interface—ISAPI, for example). Subscribers may connect to the platform 400 through the Web or WAP or other methods. The Web server may maintain the temporary data' involved in Web or WAP sessions and generate appropriate XML files. These files contain information to be presented to the subscriber (i.e., XML defines a way of structuring the information, without involving presentation). To render the information in an appropriate form on the subscriber's device (such as a computer or a wireless device) the XML files are sent to the XSL processor 404 together with corresponding XSL files created for presentation purposes. The XSL processor 404 outputs for example HTML pages (if the subscriber's device is a computer) or WML pages (if the subscriber's device is a wireless device) that are sent back for presentation in a specific browser on the subscriber's device through the user interface 402. It should be noted that while the invention contemplates all sorts of business entities, to simplify the understanding of the invention, illustrative embodiments are given using telephone companies (Telcos). It should also be noted that customers, users and subscribers are interchangeably used here. In addition administrators and users are interchangeably used here.

Figure 5:
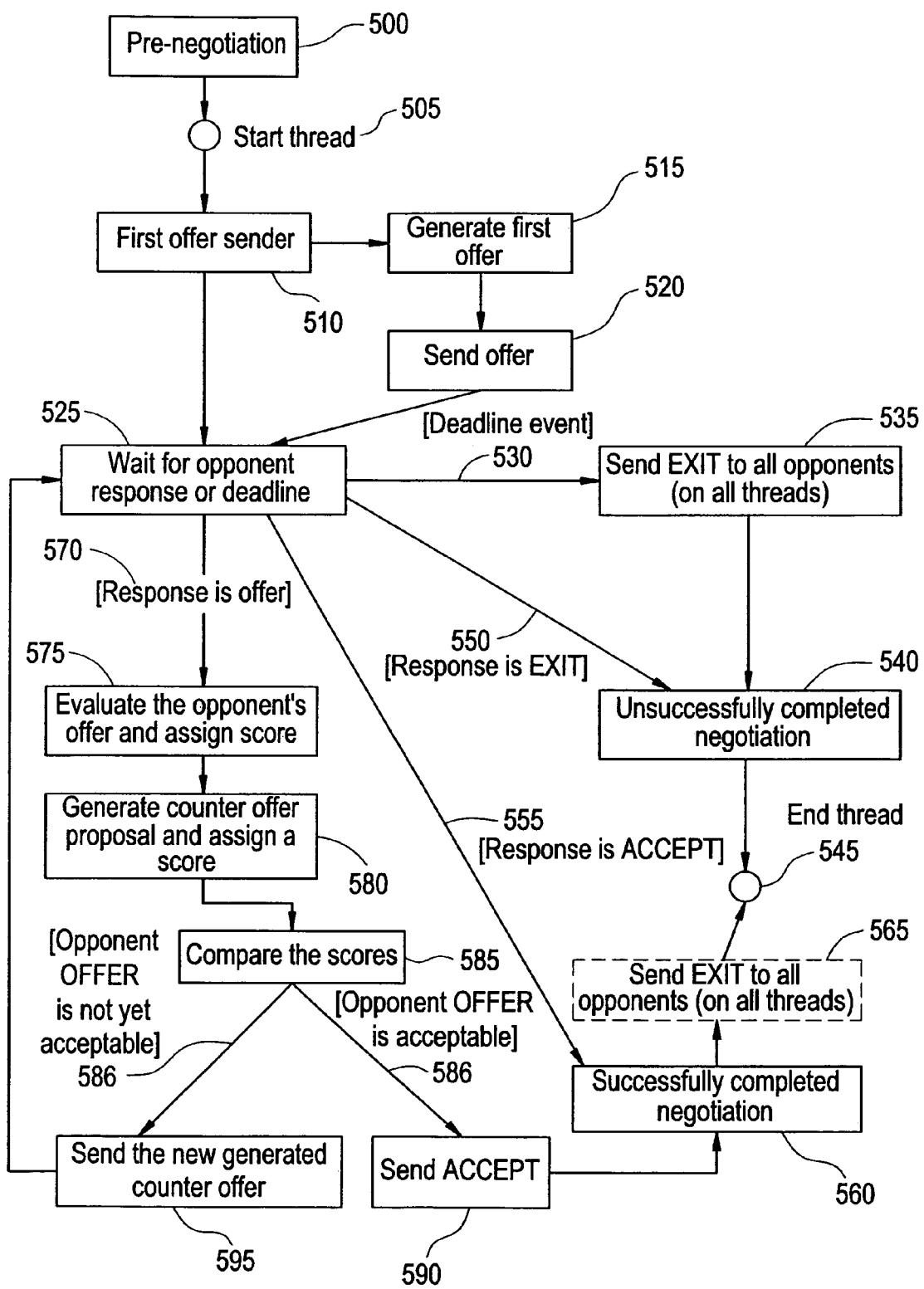
FIG. 5 illustrates a main menu of an user interface in accordance with an embodiment of the invention.

The Voxtime platform 400 is capable of supporting multiple Telcos. A Telco administrator configures various pricing policies of the respective Telco using various features available at the platform 400. Thus, the platform 400 facilitates the Telcos in practicing effective revenue generating strategies. Prior to having access to the platform, a Telco administrator usually registers with the platform. The Telco administrator usually accesses the platform 400 through a computer 116 connected to the Internet 102. The Telco administrator interacts with the platform 400 through the user interface 402. With reference to FIG. 5, in one embodiment of the invention, the user interface 402 in a form of a main menu 500 comprises a plurality of icons, some having drop-down menus. An icon represents one of the features such as Profile 504, Push 506, Futures 508 (Regular, Premium), Pull 510, Roaming 512, On Demand 514 and Messaging 516. The menu 500 usually tops every page displayed by the user interface 402.

Prior to entering the main menu, a Sign-up icon is encountered that allows an account to be set up in the platform 400. For example, clicking the Sign-up icon opens a Sign-up page that usually has several input fields such as: login information that includes login identifier and password; administrator's personal information such as name, address and so forth; and Telco information. After entering the pertinent information, subsequent updates are performed using the Profile icon 504.

The Push icon 506 provides access to features that allow the administrator to set various pricing policies. One such feature is Telco's Special Offers page, which can be sent to targeted subscribers periodically and/or based on various events that are static and/or dynamic. Another feature is the Groups page that provides grouping of subscribers that may be defined by filtering the subscriber information, wherein special offers are sent to a specified group. The Push icon 506 also provides access to a Status icon 522 in which status of offers may be viewed, a History icon 524 in which offers' history may be viewed and a Statistics icon 526 in which various statistics pertaining to the success of offers may be viewed. It should be noted that the content linked to Status icon 522, History icon 524 and Statistics icon 526 is determined by which icon was previously selected, for example, Push icon, Pull icon and so forth.

Figure 6:
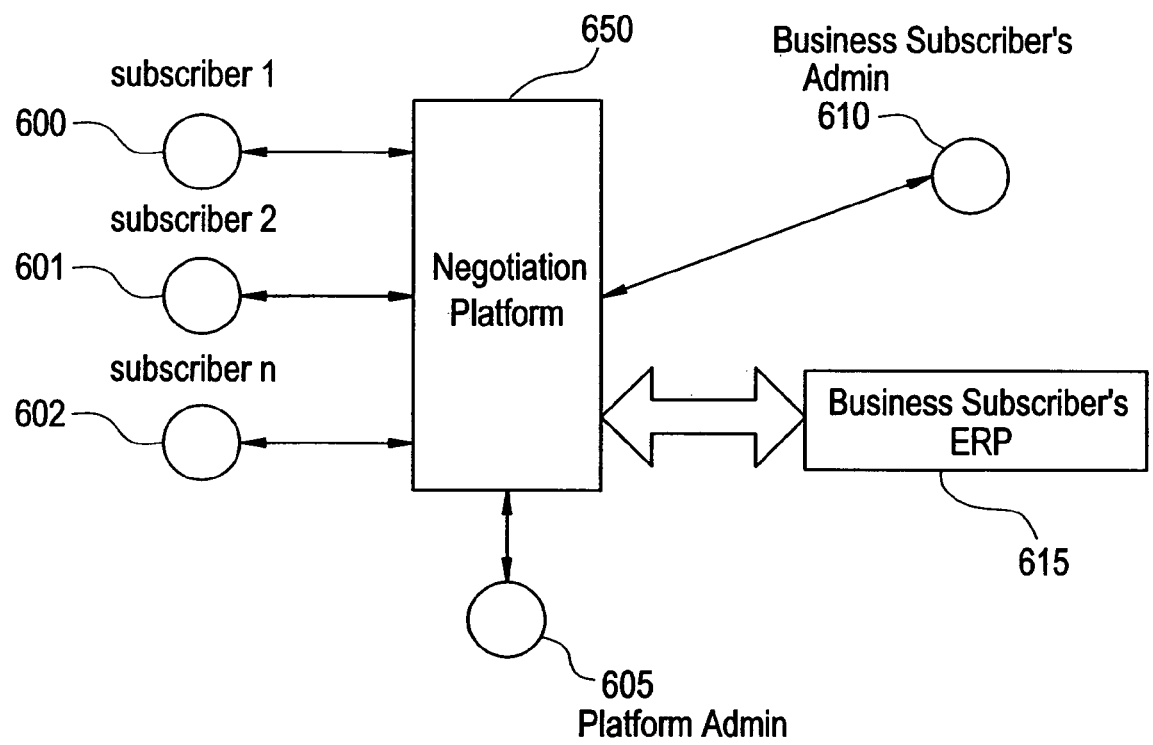
FIG. 6 illustrates a Group page in accordance with an embodiment of the invention.

In the Groups page 600, all the groups defined by the administrator is displayed as illustrated in FIG. 6. For each group, the page 600 displays information such as the name of the group 602, the number of subscribers 604 that are registered that meet the filter information set for the group and a brief description of the group 606. A new group is created by clicking a Create New Group icon 608, wherein a page appears in which a filter criteria for the group may be defined. Keywords may be specified for the string data fields that causes all subscribers that have the keywords in their corresponding field will be added to the group. Numerical values may be specified for numerical data fields or the filter criteria may be the combination of the two.

Figure 7:
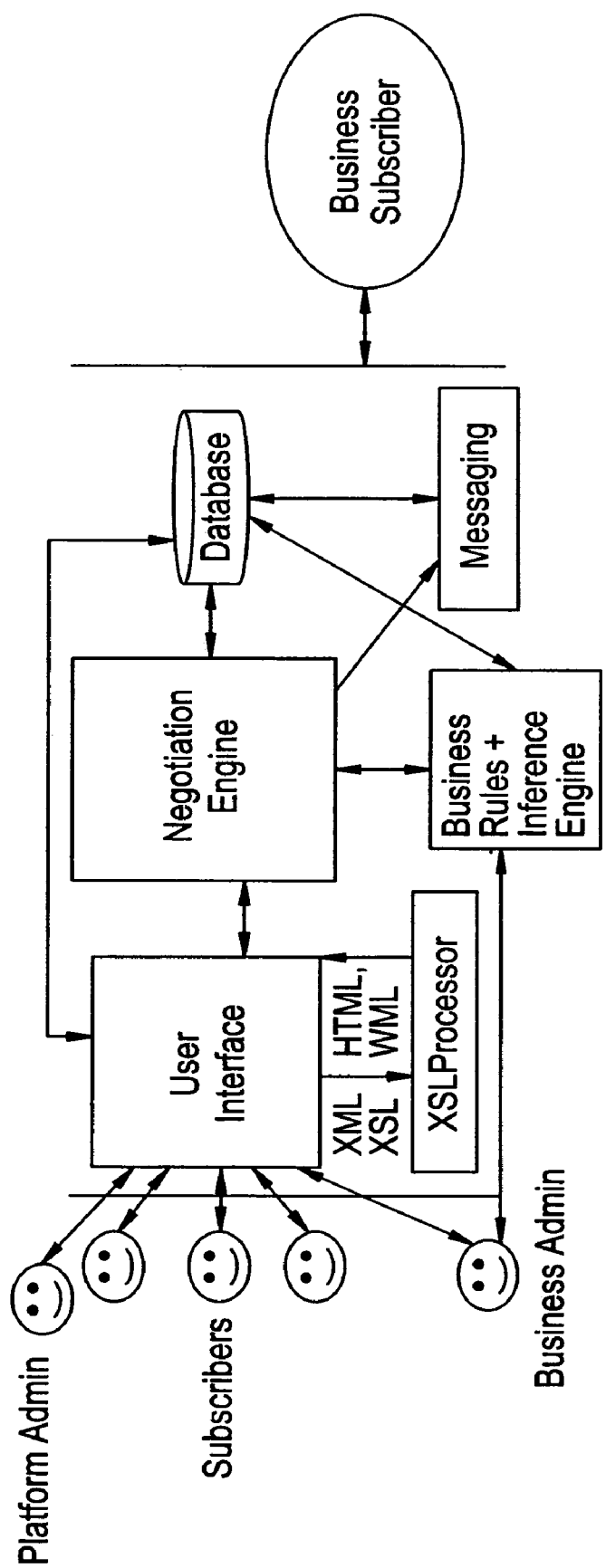
FIG. 7 illustrates a Special Offers page in accordance with an embodiment of the invention.

With reference to FIG. 7, in the Special Offers page 700, the offers that comprise the offer package are illustrated in a table that contains the name of offer package 702 (a link that may be clicked for editing the existing offer package), the group name 704 that receives the offer package (a link that may be clicked for editing the existing group), and scheduling information 706 that specifies a periodic interval or a specified time in which the offer package is to be sent. A new offer may be added by clicking the Create New Offer icon 730. According to one embodiment, an offer package comprises three options 712, 714, 716, each option comprising a rate field 722 and a call duration field 724. A subscriber receiving the offer package may accept one of the three options that suits the subscriber. The subscriber that calls within the defined time interval will pay the rate specified in the selected option for the specified call duration. The time interval 718 in which the subscriber can call is also defined in the special offer which also specifies the duration of the offer package. The page may define a date 726 and an hour 728 in which the offer package will be sent to the specified group. In addition, the page specifies a Freeze offer 729 where an offer is frozen to retain the settings of the offer but holds off on sending the offer.

Status of the offers may be obtained by first clicking the Push icon 506 and then the Status icon 522, which shows the status of the various offers. Examples of offer status are:

launched: when an offer is launched at the specified time but cannot be used because the time period which that the customers can use the offer by calling on their cell-phone.

active: when the time for calling described in offer has been reached and the end of that calling period is not ended.

pending: when an offer will be sent on a date that is not reached yet.

expired: when an offer will never be send again.

frozen: when the offer is temporary frozen and will not be send to the customers.

Figure 8:
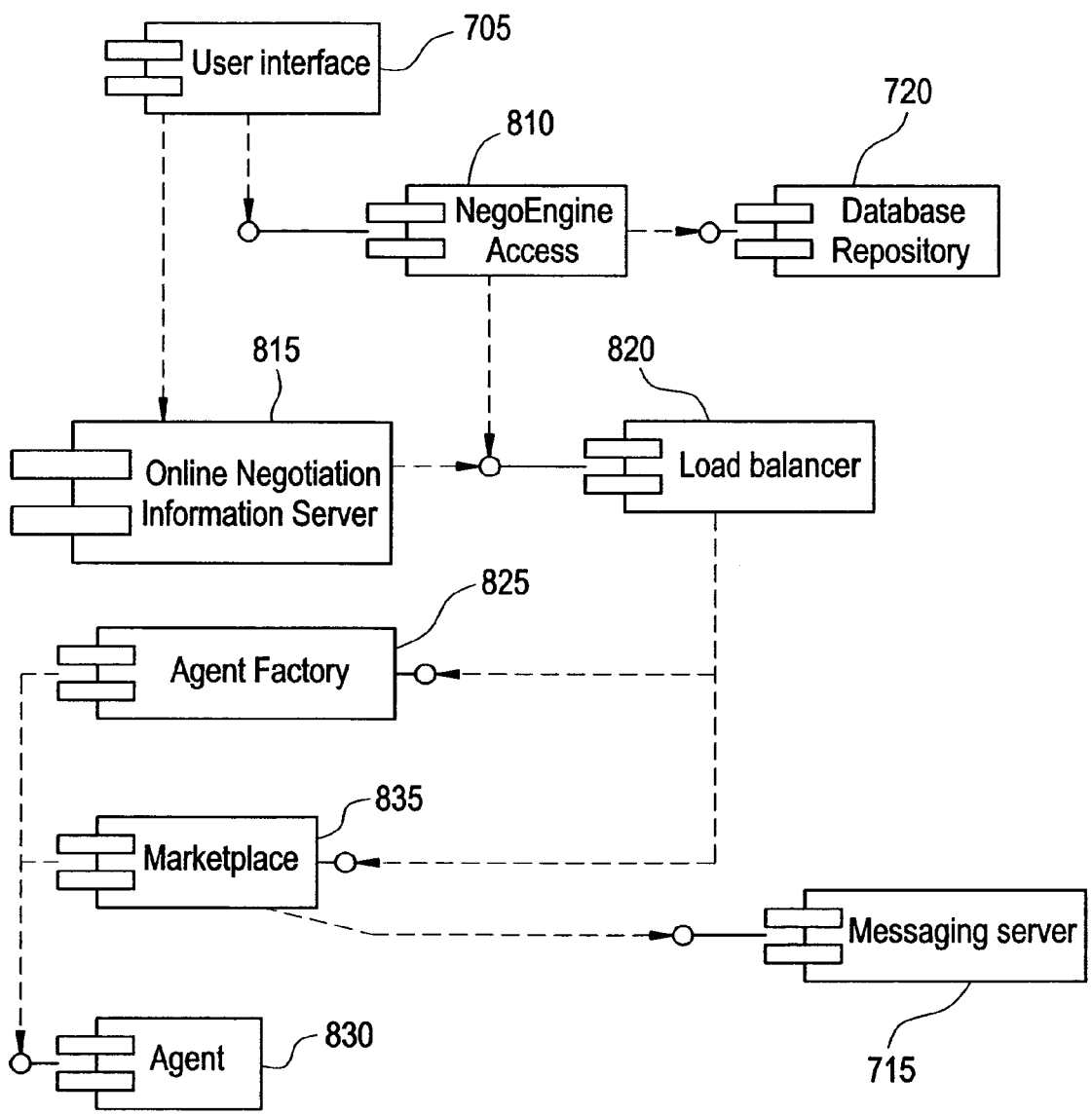
FIG. 8 illustrates a Special Offers History page in accordance with an embodiment of the invention.

With reference to FIG. 8, history of the special offers may be obtained by first clicking the Push icon 506 and then the History icon 524, which opens a History page 800 that displays all the offers that were sent from the platform to the Telco's subscribers (which offer for what group and on which date). A special date 802 may be selected and then applying this change by clicking the Change Date button 802. The 'every' modifier may be specified for a day or month or year and every offer sent on that time will be shown. For example if the day is 'Every day', the month is January and the year is 'Every year' are set, all offers sent everyday on January, on every year since the registration will be displayed.

Figure 9:
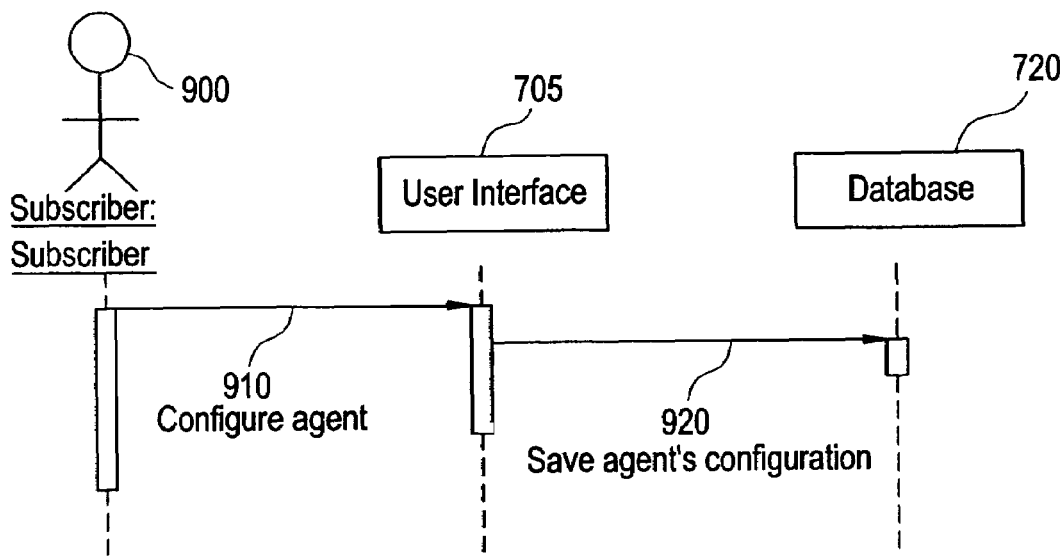
FIG. 9 illustrates a Push Statistics page in accordance with an embodiment of the invention.

With reference to FIG. 9, the Push statistics page 900 displays all potential income that may be received. The page 900 displays the name of the offer package 902 including the group name to which the offer package has been sent; the number of times the offer package was sent 904; the number of times the offer package was accepted 906; the acceptance rate 908; and the income generated 912. The administrator may analyze these statistics and may implement a different pricing policy that brings a better income to Telco.

Figure 10:
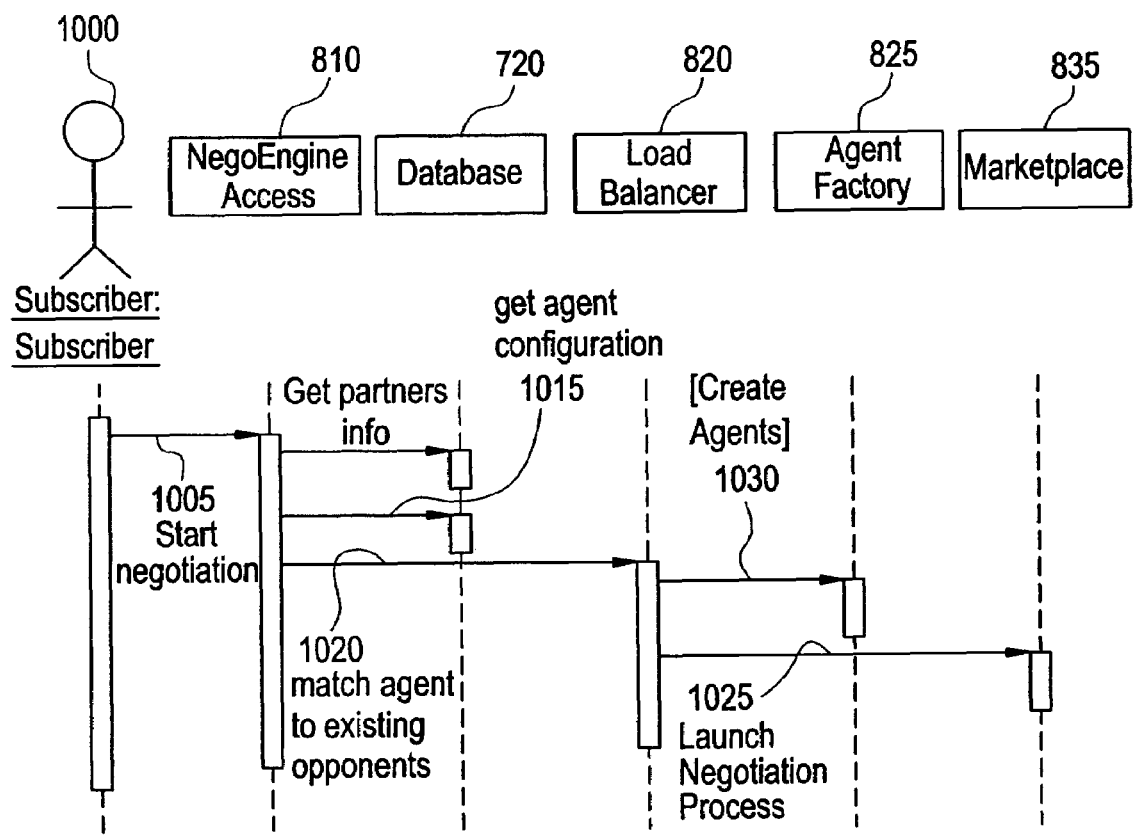
FIG. 10 illustrates a Pull Settings page in accordance with an embodiment of the invention.

The Pull icon 510 is somehow opposite to the Push icon 506 in the sense that the Pull icon applies to cases where the network is busy and the subscribers are not able to make calls. In such cases, the Pull icon 510 may be used to allow a subscriber to get a connection for a call. With reference to FIG. 10, the Pull icon 510 allows access to a Pull Settings page 1000 in which the administrator sets an extra payment that subscriber should pay in order to reserve a connection. The extra payment may be an access fee, extra rate or both for the time unit of the call. In one embodiment of the invention, there are three alternatives of payment offered to the subscriber:

a flat fee 1002, a flat fee and an extra rate 1004, an extra rate for calls 1006.

Figure 11:
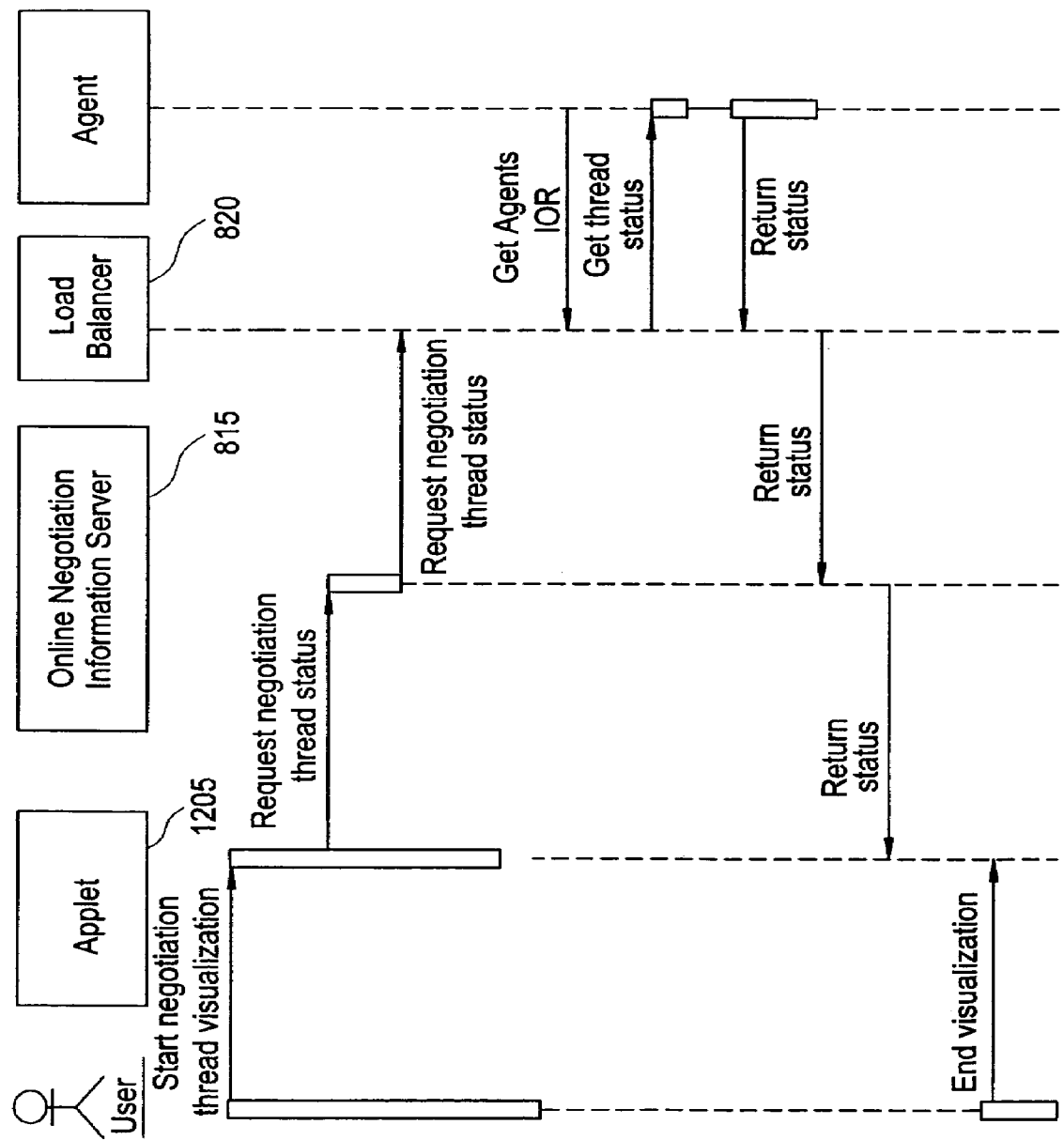
FIG. 11 illustrates a Pull Statistics page in accordance with an embodiment of the invention.

With reference to FIG. 11, when the Pull Statistics page 1100 is accessed, cases where different subscribers have met the 'network busy' state and have applied for Pull service at the platform 400 may be viewed. An income statistic 1102 that represents gains in detail for every subscriber call may be obtained. Again, an administrator may evaluate the statistics to form a better pricing policy that generates better revenues. As with the Special Offers History that is obtained in the Push icon, a History may also be obtained with the Pull icon.

According to one aspect of the invention, negotiation between a Telco and a subscriber is performed using intelligent agents. The administrator as well as the subscriber define their agents which meet at the platform 400. Intelligent agents may be characterized by a deadline, some specific information and issues on which they will negotiate. There are various issues (attributes) that may be considered: selection attributes that would be used for matching the agents that negotiate on behalf of both sides involved: Telco and subscriber (the agents are specialized on types of products or services and also an agent for a Telco enters in negotiations only with agents of its subscribers base and not with agents of subscribers from other Telco) and there are also issues that will represent the terms of deals to be negotiated.

Intelligent agents may be configured in terms of behavior in negotiation or deadline, by voluntarily stopping them or in some particular cases re-launching them. The intervals of acceptability are defined (the worst or reservation value and optionally the best value) by the master of the agent for each issue in negotiation. Thus, in accordance with one negotiation model, an agent that is performing the negotiation when receiving an offer evaluates the offer using a scoring or utility function such as the one shown below:

$$S^i(x) = \sum_{1 \leq i \leq n} w^i_j(t) S^i_j(x_j),$$

where $w^i_j(t)$ is the importance (weight) of the issue (attribute) j, $x_j$ is its value, and $S^1_j(x_j)$ is the score (or "evaluation function") of that value for agent i at time t. Examples of simple scoring functions that may be used in evaluating quantitative attributes that may characterize an receiving offer are the following:

$$S^i_j(x_j) = (x_j - \min_j)/(\max_j - \min_j),$$

if best allowable value of attribute j is $\max_j$ and worst value is $\min_j$ (e.g. price in the seller case).

$$S^i_j(x_j) = 1 - (x_j - \min_j)/(\max_j - \min_j),$$

if best allowable value of attribute j is $\min_j$ and worst value is $\max_j$ (e.g. price in the seller case).

Further details of the scoring or utility functions that may be used internally by intelligent agents in evaluating offers may be found, for example, on pages 164–165 in Howard Raiffa, "The Art and Science of Negotiation," Harvard University Press, 1982, which is incorporated herein by reference.

Keeping the utility function in reference, the Agent Settings page contains a list of agents that were created by the administrator (or subscriber). The page can be reached by clicking the Agents Settings icon located at Futures/Premium page and Futures/Regular submenus, Roaming page or On Demand page, among others. Information is displayed on created agents such as their creation date, deadline and so forth. When the agent's name is clicked it opens an Agent Configuration Setting page 1200 (See FIG. 12). The Agent Configuration Setting page 1200 comprises an agent name 1202, a location 1204 the agent is responsible for, a deadline 1206, intervals of acceptability 1208, 1212 and agent's behavior 1214.

When a behavior 1214 is clicked, an Agent's Behavior Settings page 1300 (See FIG. 13) is opened where the agents behavior may be edited. A behavior represents a combination of tactics that is applied in item's negotiation. These tactics tell the agents how to negotiate a specific item. The Agent's Behavior Settings page 1300 allows various tactics to be set for the agent's behavior. For example, setting a linear tactic means that an agent will linearly reduce or increase (depending on the agent's interest regarding that item) its item value while it will meet the corresponding item value on the subscriber side. Many types of functions may be used as tactics. Examples of such kind of functions are found for example in P. Faratin, C. Sierra, and N. R. Jennings, "Negotiation Decision Functions," Int. Journal of Robotics and Autonomous Systems (1998), 24 (3–4), 159–182.

According to this embodiment, a behavior 1302 may be configured with up to three different tactics 1304, 1306, 1308 followed by importance (weight) parameters 1312, 1314 which are set by an administrator (or subscriber).

According to an embodiment of the invention, the pages that pertain to negotiation such as futures, roaming, on demand and so forth, can be viewed by the administrator (or subscriber) and the negotiation status can be modified. Further, agent parameters may be modified even during a negotiation as will be apparent further below. With reference to FIG. 14, the list of all the agents that are currently working to accomplish their task (reach a deal) on a negotiation is displayed in the Status page 1400. There is a status page for every negotiation (futures, roaming, on demand) which is accessible through that negotiation icon. The status page 1400 is accessed from the main menu by choosing the pertinent negotiation icon and then the Status icon 522 (see FIG. 5). The list contains the name of the user agents 1402 followed by the name of the partner agents 1404 that is being negotiated with and a status column 1420. The administrator (or subscriber) can use an activate icon 1422 in the Status column 1420 to change the state of the agent from active to inactive (i.e. stop the corresponding negotiation) or verse versa. To view a real time negotiation between the agent and the partner agent, the administrator (or subscriber) can click an online view button 1424 in the status column 1420 and open the online viewer.

Figure 15:
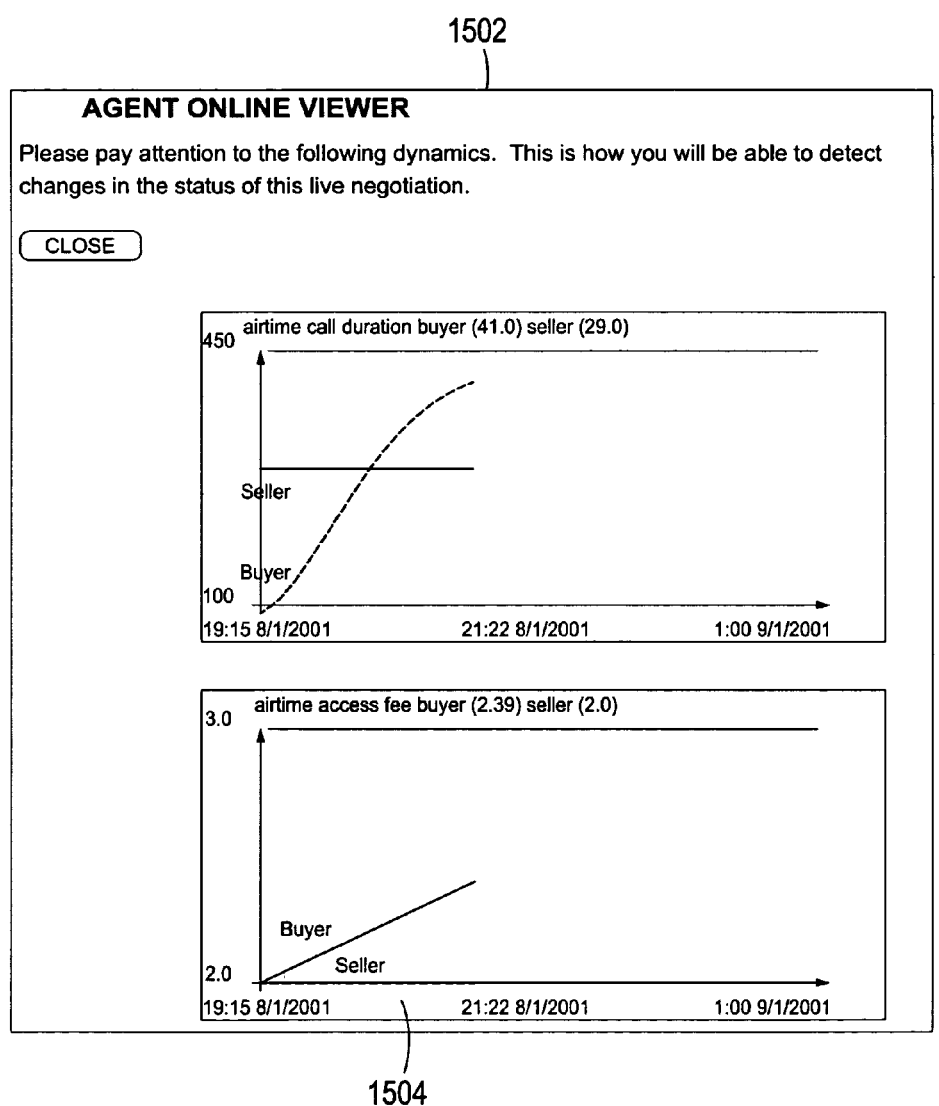
FIG. 15 is an Agent On-line Viewer in accordance with an embodiment of the invention.

With reference to FIG. 15, in accordance with one embodiment, the negotiation process may be graphically viewed on-line thereby appreciating the negotiation trend at a given moment of time. In the illustrative embodiment, the negotiation process may be viewed in any moment in terms of values of one or more components of offers sent by intelligent agent and counter-offers received from the individual opponent agents 1502, 1504 or it may be viewed in terms of values of the function $S^i$ at time t, applied on the offer sent or counter-offer received. The agent in negotiation, for example, may be stopped so that the agent's parameters may be modified by altering its intervals of acceptability and/or its behavior including weight. For example, the Agent Configuration Settings page 1200 and/or the Agent's Behavior Settings page 1300 is accessed and the parameters of intervals of acceptability, weight and/or behavior of the agent are altered respectively. The agent may then be re-launched to further the negotiation. In another embodiment, the agent's parameters may be modified while the agent is in negotiation. When the agent has finished its job, a message is sent to the Messaging page that is accessible by the Messaging icon 516. The message specifies whether the negotiation was successful or the negotiation failed. Further the message may contain some additionally information such as the other parties last offer in failure case or all the negotiated item values for successful negotiations.

With reference FIG. 16, the History page 1600 lists the agents' negotiation in terms of success or failure. The History page 1600 shows the agents name 1602 (which are links that can be clicked to edit the corresponding agent), the partner agent's name 1604 and the final status of negotiation 1606 which is a link to another page. This page shows the deal's negotiated attributes in case of successful negotiation or the both last offers of the agents for failure case. As shown in the status column 1606 there are two kinds of status: 'Deal Closed' and 'Deal Failed'. There is another status that can be met, 'Closed by user'. This is similar to 'Deal Failed' but represent a negotiation termination at the user's command. By clicking the status, a page opens that shows more details of the status. With reference to FIG. 17 and FIG. 18, the figures respectively show status information of a 'Deal Closed' case and a 'Deal failed' case. In the case of Deal Closed, the terms of the deal are displayed. In the case of Deal Failed, the user agent's last offer and the partner agent's last offer is displayed which allows an administrator (or a subscriber) to use the data to remodel its agent to increase the possibility of closing a deal, if desired.

With reference to FIG. 19, the Negotiation Statistics page shows some detailed scoring of the user agent and some averages of attributes negotiated by the agent. As an example, the administrator may analyze this information to restructure the pricing policy to enhance the revenue of the Telco.

Depending on the type of negotiation that is being performed the parameters of the negotiation varies. For instance, parameters for a long-term contract (such as 'Regular Plan') is different than a contract where the subscriber wants to reserve a connection for a given period of time so that he will not meet the 'Network Busy' signal (such as 'Premium Plans').

For Regular Plans, example parameters to negotiate are:
 term—the type (duration) of the contract,
 connection fee,
 SMS,
 local peak price,
 local off-peak price,
 local weekend price,
 long distance peak price,
 long distance off-peak price,
 long distance weekend price,
 international peak price,
 international off-peak price,
 international weekend price.

For Premium Plans, example parameters to negotiate are:
 call duration—the maximum duration of the call(s) initiated by the subscriber in the terms of the negotiated contract,
 additional rate—the extra rate for calls,
 access fee.

For Roaming Plans, example parameters to negotiate are:
 call duration,
 rate.

For Roaming Plans we have the following items (attributes) to negotiate:
 call duration,
 discount.

The messaging page which is accessible through the Message icon 516 is where the messages sent by negotiation agents can be viewed. When a negotiation agent finishes its work, it sends a message with detailed information to the platform. When the agent finishes its task successfully it sends a message that contains the negotiation attributes with values for succeeded deal. In the case of failure according to an embodiment, the message contains the last two offers for those negotiated attributes by the side of your agent and also by the side of its counter agent.

An example message may be as follows:
 Congratulations,
 This is a market notification.
 An agreement was made between seller agent 'Roaming Agent(MCI)' and buyer agent 'test2'.
 Attribute values were:
 Rate: 1.10
 Call Duration: 99
 Current GMT time is Tuesday, Apr. 25, 2000, 14:12
 Have a nice day
  VoxTime For subscribers, the platform provides both WAP and Web interfaces. On Web, subscribers can configure intelligent agents to negotiate for on demand, regular, premium and roaming plans with intelligent agents on the Telco side. Similar to the Telco administrators, subscribers can monitor the negotiations threads in which their agents are involved and are notified by their agents (by messages) about the success or failure of the negotiation. Also, there are pull and push pages where subscribers can customize preferences that filter the potential offers they may receive from the Telco side, accept or reject offers, read statistics, see histories, etc.

The area of services available by WAP is more restricted than the one on the web, mainly because of still limited capabilities of the screens and micro browsers of the WAP phones. With regard to the services involving negotiating agents, on-demand agents may be launched and re-launched by using WAP phones with a configuration previously set through the Web interface, for example.

The platform 400 is accessible from mobile phones through the WAP Interface. Because of the limited resources offered by mobile devices, the WAP Interface should take into account the limited resources.

Figure 24:
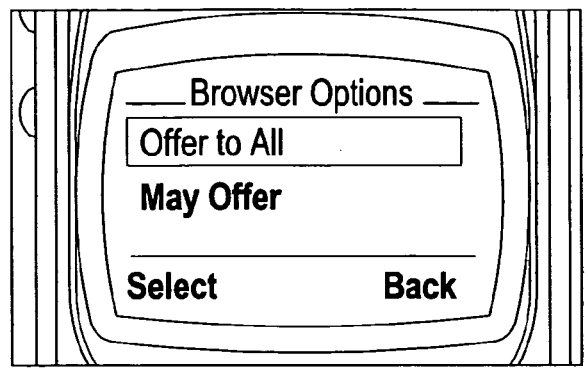
Figure 25:
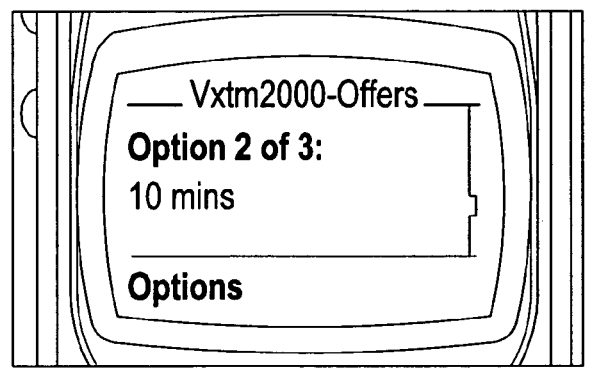
Figure 26:
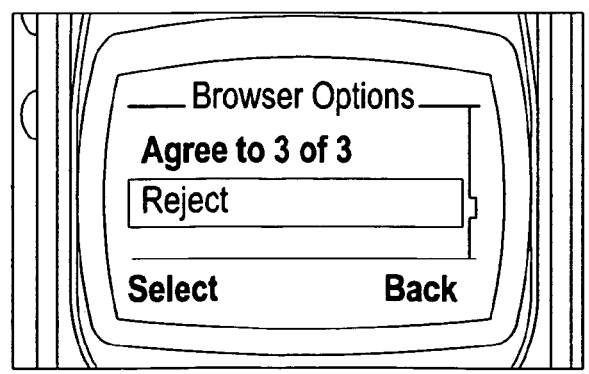

FIGS. 20–36 illustrate a WAP interface together with images that depict the screens that appear on a wireless phone. In FIG. 20, the subscriber logs into the platform. In FIG. 21, the subscriber enters a valid user name and password. In FIG. 22, a greeting message notifies the user that he/she has connected to the platform service. In FIG. 23, the subscriber is provided with a main menu. In this instance, the platform makes available four services which are:
 Special Offers
 Messaging
 Pull Sevice
 On-Demand Special Offers
 With reference to FIGS. 24–26, selecting the Special Offers option (see FIG. 24) allows the subscriber to display and browse the list of offers received. In FIG. 25, when a particular offer in the list is chosen the subscriber is able to see its content (consisting of three choices). In FIG. 26, the subscriber may accept one of the choices (by selecting the 'Agree' option displayed at the end of every choice) or to reject the offer (by selecting the 'Reject' option).

Messaging
 Displays the list of messages received from the platform and allows the subscriber to browse it.

Figure 27:
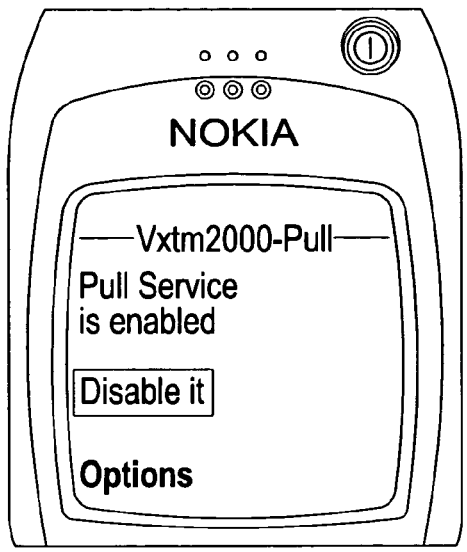
Figure 28:
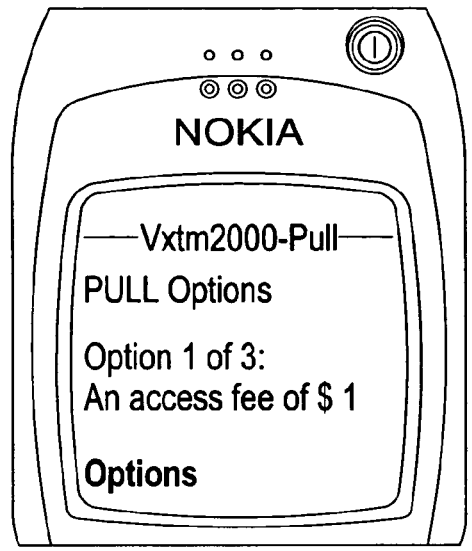
Figure 29:
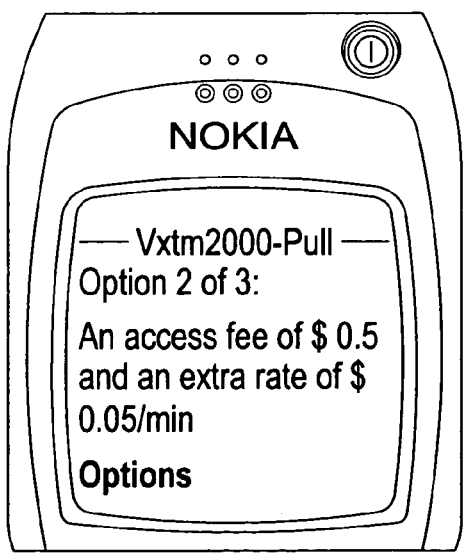
Figure 30:
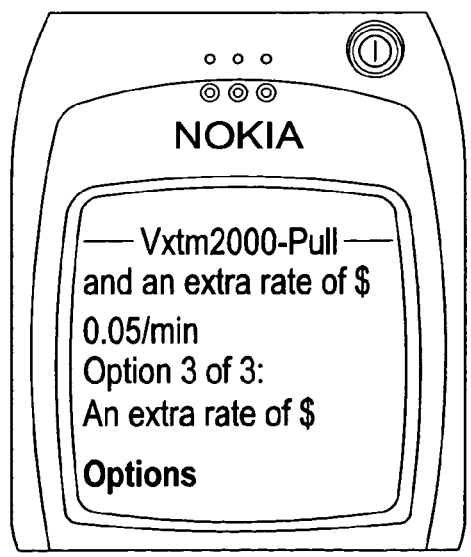
Figure 31:
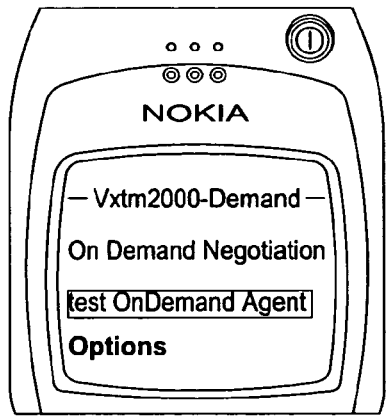
Figure 32:
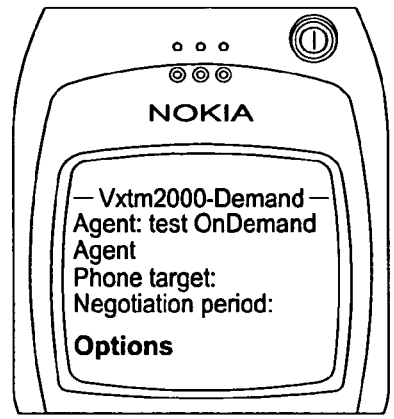
Figure 33:
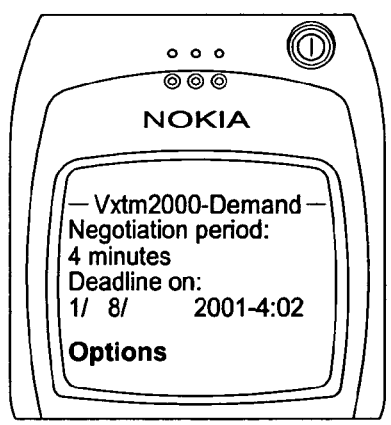
Figure 34:
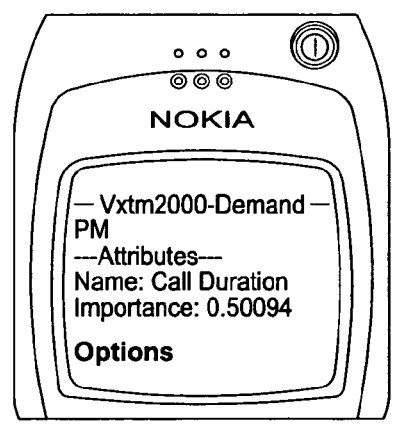
Figure 35:
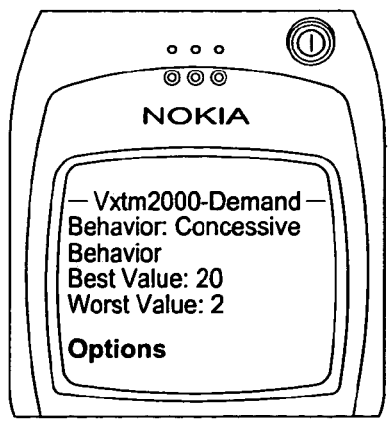
Figure 36:
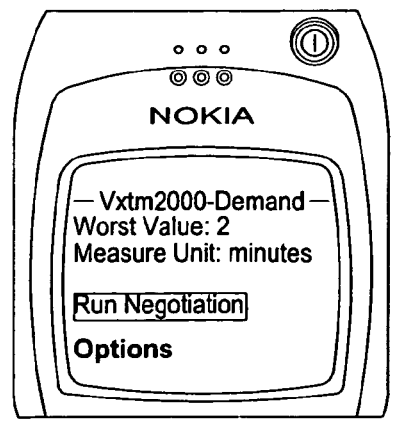

PULL Service
 With reference to FIGS. 27–30, in FIG. 27, the Pull service allows the subscriber to enable or disable the service. In FIGS. 28–30, the Pull service displays the Telco's offer package which may comprise of three choices. The user can either accept one of the three choices or reject the offer, using one of the options shown in the picture below.

On Demand
 With reference to FIGS. 31–36, the subscriber can check out the settings of the on demand agent, and run negotiations. In FIGS. 31–35, prior to negotiation, the subscriber can view the agent configuration by selecting the Test OnDemand Agent option that is displayed. This selection shows the subscriber configuration such as Negotiation Period, Attributes and Behavior among others. Once the subscriber is satisfied, in FIG. 36, the subscriber may select the Run Negotiation to activate the agent. The subscriber can view the negotiation process by requesting on-line view which typically displays in terms of the function $S^i(x)$ at time t on the screen due to screen size limitation. However, for wireless devices with larger screens, the negotiation process can be viewed in terms of one or more scores $w^i_j(t)S^i_j(x_j)$ 1502, 1504 of the utility function of the agent at time t or in terms of the function $S^i(x)$ at time t as illustrated in FIG. 15. The subscriber can then stop the negotiation and select the On Demand option to modify the agent's parameters such as intervals of acceptability, weight and behaviors. The subscriber can then re-launch the agent for further negotiation. Alternatively, the subscriber can modify the agent's parameters during negotiation process.

The following passages below are various exemplary features that are provided by the platform. The first example pertains to negotiating long-term contracts (i.e. regular plan). John Doe is a subscriber of WorldTel, one of the wireless providers of his country. He finds out that a new Internet service supplied by the platform is available with his provider. His contract with WorldTel needs to be renewed for the next month. In order to renew his contract he has two alternatives to follow. The first one is to take the usual steps: go to the closest provider office and ask for a new contract. He can choose the same type of contract or he can ask for another type if he thinks the old one no longer satisfies his needs. As an alternative, he can register with the platform. He gets an account and he can choose to negotiate his contract by instructing his negotiation agent. He wants a contract with maximum 10 c per minute during off-peak hours and maximum 20 c during peak hours. He usually uses his phone after work hours so he is more interested in getting a lower rate for off-peak hours. Also, he uses the phone to call his son in West City. So he will try to get of discount on the account of the intensive use of the same phone number. As he doesn't use the phone in roaming, a discount for this type of service is of no interest to him. After he has fully instructed his negotiation agent, he logs out of the platform and waits for his agent to let him know, the very next day, the final results of the negotiation.

Next day in the morning he receives a WAP message on his mobile phone. The agent succeeded in negotiating for him a contract. He can monitor/preview the contract's terms on his mobile's display. Because he finds the contract very convenient, he decides to take it, so he presses the "Agree" button. This is a better alternative to what the provider's office could offer him! The platform acknowledges his agreement and informs/notifies WorldTel about the new contract. An hour later John Doe is informed that he can take advantage of the new contract.

The second example pertains to negotiating an airtime reservation (i.e., premium plan). John Doe is a subscriber of WorldTel, one of the wireless providers of his country. He needs to keep in touch with his real estate agent, so he needs guaranteed network access every day between two o'clock and three o'clock a.m. for the next thirty days. The solution to his problem would be to make an airtime reservation. He learns that an Internet service, provided by the platform is available with his provider, and this service comes along with the facility to make airtime reservations. Here are the steps he takes. He registers with the platform and he gets an account. A negotiation agent is assigned to him. Next, he has to instruct his agent to do some work on his behalf.

The platform offers him two alternatives: either to negotiate a flat fee regardless of if he will access the network or not during the period reserved or to negotiate a different rate to be charged for the calls within the desired period. He doesn't know for sure if he will make calls every single day, so he thinks it would be more convenient for him to get an airtime reservation based on a different charge for calls. Also, he is not willing to pay more than 30 c as a charge for the calls during the re served period. After having instructed his agent about the reservation's period and hours and the maximum price he affords, he logs out of the platform and waits for his agent to let him know, the very next day, the final results of the negotiation.

Next day in the morning he receives a WAP message on his mobile phone, telling him that his agent succeeded in negotiating for him an airtime reservation. He can monitor the negotiated terms on his mobile's display. He thinks these perfectly match his needs, so he decides to take the offer and presses the "Agree" button. The platform acknowledges his agreement and informs/notifies WorldTel about the new reservation. An hour later John Doe is informed that he can take advantage of this reservation.

The next example pertains to a Push feature offered by the platform. Chris is a subscriber of WorldTel, one of the wireless providers of his country. Also he is registered with the platform, which supplies an Internet service available with his provider. He has a future contract with WorldTel.

He is a businessman and he usually makes an extensive use of his phone during late hours talking to his associate in America. He is one of the subscribers that usually take advantage of the special offers, so the Internet service sends him such offers on a regular basis.

It is eleven o'clock in the night. Chris receives a WAP message on his phone with some special offers for him available for the next three hours: 15 min at a charge of 60 c, 10 min at a charge of 50 c or 7 min at a charge of 40 c. He was going to make a phone call in America to speak with his associate. So he is very interested in the new received special offers. He decides that a 15-minute call would suit him perfectly. So he selects the second of the special offers. The platform acknowledges the fact that he accepted one of the offers and informs/notifies WorldTel about this. Consequently, the next 15 minutes Chris will use his phone within the next three hours, will be charged accordingly to the special offer.

The next example pertains to the Pull feature of the platform. Chris is a subscriber of WorldTel, one of the wireless providers of his country. Also he is registered with the platform, which supplies an Internet service available with his provider.

It's twelve o'clock in the afternoon and he has to make an urgent call but he gets a "network busy" message. This is a peak hour and the network is overloaded so, the chance for him to find an empty channel is minimum. Just to keep on trying to make this call would lead him to further and unacceptable delay. With the service of the platform, he has the possibility to get an empty channel, either by paying a flat fee or by paying an extra charge for the call made during the period the empty channel is reserved. He uses the pull feature on his phone to get a channel. His estimation is that his call will be short so he asks for an extra charge of 15 c per minute. The platform sends him an offer package from which Chris chooses the appropriate offer suitable to his needs. The platform now lets Chris avail himself of the empty channel in accordance with the selected offer.

Having thus far described at least one illustrative embodiment of the invention, various alterations, modifications and improvements will readily occur to those skilled in the art. Such alterations, modifications and improvements are intended to be within the scope and spirit of the invention.

Accordingly, the foregoing description is by way of example only and is not intended as limiting. Accordingly, the invention is defined by the following claims and equivalents thereof.

What is claimed is:

1. A method for enhancing negotiations for telecommunication services for a party using an interface comprising:
   providing a negotiation engine for negotiating telecommunication services between a party and a telecommunications provider;
   providing an intelligent agent for negotiating, on behalf of the party, telecommunication services of the telecommunications provider; and
   providing an interface having one or more editable fields corresponding to telecommunication service parameters for the negotiation,
   wherein the one or more parameters being selected from the group consisting of: a maximum cost of airtime for a predefine unit period, a maximum cost of airtime during a peak airtime period for a predefined unit period, a maximum cost of airtime during an off-peak airtime period for a predefined unit period, a predetermined airtime reservation, a flat fee for cost of the use of the telecommunication services for a unit period of time during a predetermined airtime reservation, and a maximum cost of roaming.

2. The method according to claim 1, wherein the interface is provided for either or both of the party and the telecommunications provider.

3. The method according to claim 1, further comprising notifying the party of a successful negotiation result.

4. The method according to claim 3, further comprising the telecommunications company receiving an acceptance of the negotiation result by the party.

5. A method for enhancing negotiations for telecommunication services using an interface comprising:
   providing a negotiation engine for negotiating telecommunication services for a telecommunications provider;
   providing an intelligent agent for negotiating, on behalf of a party, telecommunication services of the telecommunications provider;
   providing an interface having one or more editable fields corresponding to telecommunication service parameters for the negotiation;
   notifying the party of a successful negotiation result; and
   the telecommunications company receiving an acceptance of the negotiation result by the party,
   wherein the one or more parameters are selected from the group consisting of: a maximum cost of airtime for a predefine unit period, a maximum cost of airtime during a peak airtime period for a predefined unit period, a maximum cost of airtime during an off-peak airtime period for a predefined unit period, a predetermined airtime reservation, a flat fee for cost of the use of the telecommunication services for a unit period of time during a predetermined airtime reservation, and a maximum cost of roaming.

6. The method according to claim 5, wherein the interface is provided for either or both of the party and the telecommunications provider.

7. A computer readable medium having computer readable instructions provided thereon for allowing a computer system to carry out a method for enhancing negotiations for telecommunication services using an interface, the method comprising:
   providing a negotiation engine for negotiating telecommunication services for a telecommunications provider;
   providing an intelligent agent for negotiating, on behalf of a party, telecommunication services of the telecommunications provider; and
   providing an interface having one or more editable fields corresponding to telecommunication service parameters for the negotiation,
   wherein the one or more parameters are selected from the group consisting of: a maximum cost of airtime for a predefine unit period, a maximum cost of airtime during a peak airtime period for a predefined unit period, a maximum cost of airtime during an off-peak airtime period for a predefined unit period, a predetermined airtime reservation, a flat fee for cost of the use of the telecommunication services for a unit period of time during a predetermined airtime reservation, and a maximum cost of roaming.

8. The computer readable medium according to claim 7, wherein the interface is provided for either or both of the party and the telecommunications provider.

9. The computer readable medium according to claim 7, further comprising computer instructions for enabling the computer system to notify the party of a successful negotiation result.

10. The computer readable medium according to claim 8, further comprising computer instructions for enabling the telecommunications company to receive an acceptance of the negotiation result by the party.

11. A computer system for carrying out a method for enhancing negotiations for teleconmiunication services using an interface, the method comprising:
    a negotiation engine for negotiating telecommunication services for a telecommunications provider;
    an intelligent agent for negotiating, on behalf of a party, telecommunication services of the telecommunications provider; and
    an interface having one or more editable fields corresponding to telecommunication service parameters for the negotiation,
    wherein the one or more parameters are selected from the group consisting of: a maximum cost of airtime for a predefine unit period, a maximum cost of airtime during a peak airtime period for a predefined unit period, a maximum cost of airtime during an off-peak airtime period for a predefined unit period, a predetermined airtime reservation, a flat fee for cost of the use of the telecommunication services for a unit period of time during a predetermined airtime reservation, and a maximum cost of roaming.

12. The system according to claim 11, wherein the interface is provided for either or both of the party and the telecommunications provider.

* * * * *